Figure 1:
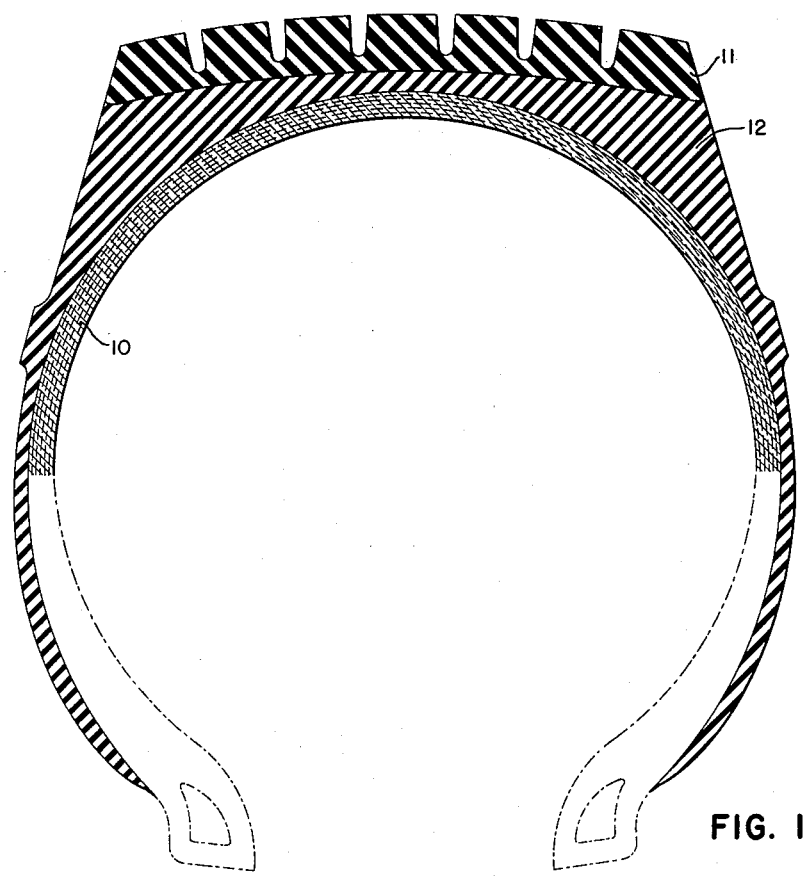

Nov. 17, 1964   R. J. BROWN   3,157,218
PNEUMATIC TIRES HAVING IMPROVED TREADS
Filed Aug. 30, 1962

INVENTOR.
ROBERT J. BROWN
BY
J.B. Holden
ATTORNEY

United States Patent Office

3,157,218
Patented Nov. 17, 1964

3,157,218
PNEUMATIC TIRES HAVING IMPROVED TREADS
Robert J. Brown, Akron, Ohio, assignor to The Goodyear Tire & Rubber Company, Akron, Ohio, a corporation of Ohio
Filed Aug. 30, 1962, Ser. No. 220,375
6 Claims. (Cl. 152—330)

This invention relates to pneumatic tires and particularly to pneumatic tires having an improved tread construction.

For several years pneumatic tires have been constructed by building up a plurality of fabric plies on a cylindrical building drum and then applying a tread made of a tough rubber composition designed to produce a tire that has maximum performance properties, including the ability to give a high degree of resistance to tread wear without resulting in excessive heat build-up in the tire. Many rubber formulations have been proposed and used in an effort to arrive at the most preferred combination of characteristics in tread wearing and traction ability without having a tire that is prone to excessive heat build-up, groove cracking or other undesirable characteristics.

Heat build-up in pneumatic tires, particularly in large truck tires, has been a very difficult problem to control. Natural rubber has in the past been the only type of rubber from which completely successful treads for large truck tires can be produced. Various synthetic rubber formulations have been extensively evaluated, but those that could successfully pass the heat build-up tests have failed on one or more of the following characteristics which are recognized as virtually necessary for a satisfactory truck tire. These desirable characteristics include resistance to tread cracking, resistance to rib tearing, good abrasion resistance and good traction qualities against the road surfaces with which they come into contact.

It is therefore an object of this invention to produce a pneumatic tire having an improved tread.

It is a further object of this invention to produce a pneumatic tire with an improved tread that is not subject to excessive heat build-up during service.

It is still a further object of this invention to provide a tire tread which has a high degree of resistance to groove cracking, rib tearing and abrasion.

These and other objects and advantages which will become apparent reside in the construction and compounding techniques employed in fabricating the improved treads. The manner in which these advantages may be obtained will be apparent from the following detailed description and drawings.

The present invention provides a means of utilizing polybutadiene rubber in treads in a manner which preserves all of the desirable characteristics of this polymer without exceeding the running temperatures of natural rubber treads and at the same time providing a tread which is highly resistant to rib tearing. The present invention provides improved treads which are produced by having an outer road-contacting portion or cap formulated from a rubber composition which is highly resistant to abrasion, rib tearing and tread cracking and an underlying base portion positioned between the main body or carcass of the tire and the road-contacting portion or cap of the tread, said base portion being formulated from a relatively cool running rubber composition. In accordance with the present invention the road-contacting portion or cap of the tread is comprised of a blend of an elastomeric copolymer of butadiene and styrene and a polybutadiene rubber having a high percentage of its polymerized monomer units in a 1,4 configuration. The base portion of the tread is comprised of a blend of a polyisoprene rubber in which at least about 80% is of a cis-1,4 structure and a polybutadiene rubber having a high percentage of its polymerized monomer units in a 1,4 configuration. In the above description of polybutadiene rubber a polymer having 85% or more of its polymerized monomer units combined in a 1,4 structure is to be considered as having a high percentage of cis-1,4 configuration. The above description of polyisoprene rubber is intended to include natural rubber which contains a high percentage of cis-1,4 polyisoprene and also the polyisoprene synthesized from monomeric isoprene by means of stereo specific catalyst in which the isoprene residues are added in a manner that results in a microstructure of at least 80% cis-1,4.

In accordance with a preferred embodiment of the present invention the outer road-contacting portion of the tread is comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of an elastomeric copolymer of butadiene and styrene. The base portion of the tread is comprised of from 80 to 25% by weight of a rubbery stock of polyisoprene in which at least about 80% is of a cis-1,4 structure, and from 20 to 75% by weight of a rubber stock of polybutadiene having at least about 30% of its polymerized monomer units in a cis-1,4 configuration and no more than about 15% of its monomer units polymerized through 1,2 addition.

Figure 2:
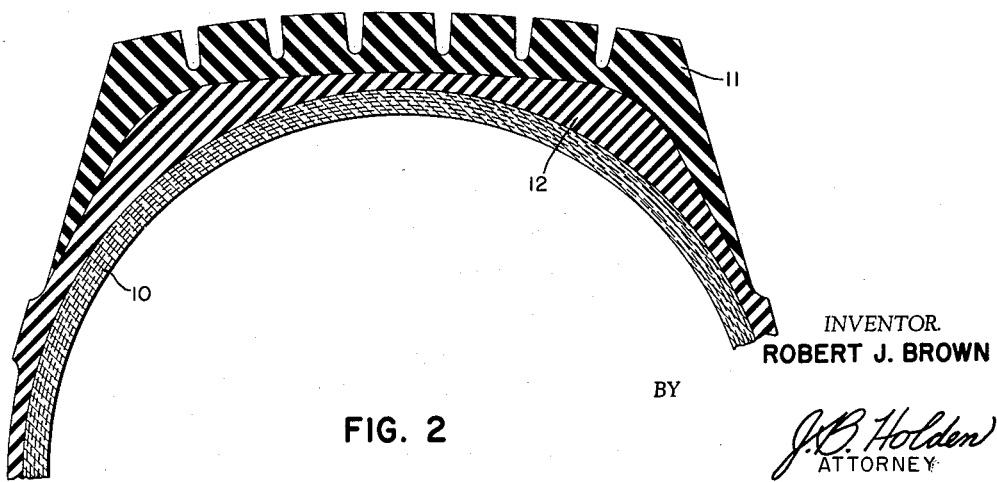

The construction of the treads which are to be formulated in accordance with the present invention may be more readily understood by referring to the attached drawings wherein FIGURE 1 is a cross-sectional view of a tire having an improved tread construction showing the cap portion of the tread terminating at the edge of the shoulders. FIGURE 2 is another cross-sectional view of a tire having an improved tread in accordance with the present invention wherein the cap portion of the tread extends part way up the sides of the tire. In both drawings the tire comprises a conventional carcass 10 with an improved tread composed of a road-contacting portion or cap 11 containing a tractionizing design and an underlying base portion of the tread 12 which will normally be in direct contact with the carcass of the tire. However, the tire may be constructed in such a manner as to have a tie gum or breaker strip between the base and carcass.

The thickness of the cap and base portions of the improved treads produced in accordance with the present invention may vary over a substantial range. However, in general it has been found that the base portion of the tread should be at least 1/16 of an inch in thickness and that the cap portion of the tread should have at least 1/16 of an inch of rubber below the bottom of the tread grooves. The invention may be advantageously employed in building any size tires in order to obtain the superior performance inherent in the disclosed tread construction. As previously indicated, large truck tires are very susceptible to destructive heat build-up and the present invention finds its greatest utility in large tires, particularly sizes 9.00 and larger. It will be apparent to one familiar with rubber compounding and tire building techniques that various other modifications in the arrangement of the cap and base in addition to those specifically shown may be employed within the broad scope of the present invention.

The 1,4 polybutadiene rubbers which are to be used in preparing the cap and base portions of the treads have been described in various literature references and patents. One convenient method for preparing these polymers is through the use of a catalyst composed of trialkyl aluminums such as triethyl aluminum or triisobutyl aluminum in conjunction with titanium tetrachloride, as described in Belgian Patent No. 551,851. These particular catalyst systems are preferred for the reason that higher levels of cis-1,4 content are obtainable through their use, and it has generally been observed that the improvement in the physical properties and the increase in service life of the products made from cis-1,4 polybutadiene polymers are in direct relationship to the amount of cis-1,4 content in the polymer employed. Cis-1,4 contents in excess of 90% may be achieved through the use of the above-described catalyst systems. Additional literature references which give further information on methods of producing 1,4 polybutadienes that may be employed in compounding treads in accordance with the present invention are:

(1) "New Controlled-Structure Polymer of Butadiene," Rubber and Plastic Age, March 1961, pages 276–282, by W. W. Crouch.

(2) "1,4-Cis Polybutadiene," Gummi and Asbest, vol. 13, page 1026 (1960).

(3) "Compounding Diene Rubber and Testing," by Ward A. Smith and James M. Willis, Rubber Age, vol. 87, No. 5, August 1960.

Rubber compositions contain a blend of 1,4 polybutadiene and GRS polymer for use in fabricating the cap portions of the improved treads of this invention and the blend of 1,4 polybutadiene and polyisoprene rubber used in the underlying base portion of the treads may be compounded with conventional rubber compounding additives such as carbon black, sulfur, accelerators, antioxidants, extending oils, etc. It has been found that a tread having maximum performance characteristics is obtained if an abrasive type furnace black is used in the cap portion of the tread. The following examples are illustrative of the compounding formulations which may be employed in making a suitable rubber stock for the cap and base portions of the improved treads.

EXAMPLE I

Rubber stocks to be employed in the cap and base of a tread were prepared from the following formulation wherein all parts are expressed in terms of parts by weight per 100 parts by weight of rubber.

| Ingredients | Tread Cap Formulation | Tread Base Formulation |
| --- | --- | --- |
| Rib Smoked Sheets | | 32.50 |
| Crepe or Blanket | | 17.50 |
| Oil extended SBR (1712) | 68.85 | |
| Cis-1,4 polybutadiene | 50.00 | 50.00 |
| FEF (Fast extruding furnace black) | | 47.00 |
| Intermediate super abrasion furnace black | 70.00 | |
| Medium process Oil | | 15.00 |
| Stearic acid | | 2.00 |
| Diaryl-p-phenylene diamine (antioxidant) | | 0.75 |
| Phenyl beta naphthylamine | | 0.35 |
| Phenyl alpha naphthylamine | | 1.00 |
| Diphenyl-guanidine | 0.75 | |
| Zinc Oxide | 3.00 | 5.00 |
| Sulfur | 1.25 | 1.50 |
| Naphthenic Extending Oil | 20.00 | |
| 2,2′ Bisbenzothiazole disulfide | 0.70 | 0.50 |
| Morpholine Benzothiazyl Sulfenamide | | 0.50 |
| | 214.55 | 173.60 |

EXAMPLE II

Additional examples of cap formulations which may be employed are:

| Ingredients | 20% PBD/ 80% SBR | 75% PBD/ 25% SBR |
| --- | --- | --- |
| Oil extended SBR (1712) | 110.00 | 34.38 |
| Cis-1,4 polybutadiene | 20.00 | 75.00 |
| Intermediate super abrasion furnace black | 70.00 | 70.00 |
| Medium process Oil | 12.00 | 20.00 |
| Diaryl-p-phenylene diamine (antioxidant) | 1.90 | 2.00 |
| Paraffin Wax | .80 | .80 |
| Microcrystalline Wax | 3.00 | 3.00 |
| Stearic Acid | 2.00 | 2.00 |
| Zinc Oxide | 3.00 | 3.00 |
| Benzothiazyl disulfide | .70 | .90 |
| Diphenyl-guanidine | .75 | .75 |
| Sulfur | 1.50 | 1.15 |
| | 225.65 | 212.98 |

The proportions of polybutadiene (PBD) which can be most successfully employed in the cap and base portion of the tread vary from 20 to 75%. It has been found that blends containing more than 75% PBD are generally quite difficult to process on normal rubber processing equipment since they have relatively little cohesiveness and tack and therefore will not band well on a mill. Blends of PBD and SBR rubbers containing less than about 20% PBD generally have relatively poor rib tearing qualities. Blends of PBD and polyisoprene rubbers containing less than about 20% PBD frequently promote excessive cracking in the cap portion of the tread.

As has been emphasized above one of the most desirable characteristics for pneumatic truck tires is that they must have a high degree of resistance to rib tearing. Rib tearing is a term used to define the tendency of portions of the tread rubber to tear free from the main body of the tread when the tire is impinged against sharply angular objects such as cement curbings. The tendency for treads to rib tear is particularly acute with heavily loaded truck tires. In order to evaluate the resistance of various treads to rib tearing a test was devised in which a heavily loaded truck equipped with test tires on the rear dual wheels was repeatedly driven back and forth over a cement curb at a small oblique angle.

The running temperature of the tires was determined by running them on a Bureau of Standards dynamometer against a 67 inch smooth flywheel. All tires were tested at 35 miles per hour and standard inflation. The tires were run on a break-in period at 85% of their rated load for three hours. After the three hour break-in period the load was increased to the rated capacity for the tire and run until no further heat rise was detected. The temperature was then measured with a thermocouple probe through the tread to the tread-carcass junction at the center line and at the outside ribs.

Tread wear rating of the tires was determined by road testing them on a tractor-trailer truck, tandem axle trailer, single axle drive. Tests were conducted at 45 miles per hour with tires having standard inflation and carrying 15% overload. Tires were started in the rear tandem position on both sides, at approximately 700 to 800 mile intervals they were moved to the front tandems and then to the drive position on the same side of the truck. The tires were then taken to the opposite side of the truck and rotated through the various wheel positions. This order of rotation continued through the remainder of the test. The skid depth was measured each rotation and recorded as skid loss as compared to original skid depth. All measurements were compared to a control for rating basis.

The tread cracking rating of the tires was determined by a visual inspection which was made each time the tires were measured for skid loss, as discussed in the above-described tread wear rating test. Tread cracking was recorded as the length in inches of the total cracks in all grooves which developed during the tread wear rating test.

In order to evaluate the overall performance of tires having treads built with the cap-base type construction of the present invention a number of test tires were produced. All test tires in this series were 10.00–20 truck tires built on a 100 level tire carcass with the different treads as described in the following table. Treads having a cap-base construction were applied as a one piece tread having been previously formulated by simultaneously extruding the cap and base portion of the tread through two different extruders and combining them in the proper proportion in a common extruder head so that the finished cap-base construction is emitted through a single die (equipment of this type is commonly referred to as a dual tuber). However, they may also be prepared by extruding the cap and base portion of the tread through two different extruder heads and adhering them together preferably while they are in a hot freshly extruded condition. Each of the following evaluations of tread performance was compared with natural rubber unit treads evaluated under the same test conditions. Tread wear ratings are reported on a comparative basis using a rating of 100 to designate the wear in a natural rubber tread. Tread cracking is reported as the length in inches of the total cracks appearing in all grooves during the tread wear rating tests. Rib tear ratings were determined in accordance with the above-described procedure and performance evaluated by assigning an arbitrary rating to each tread, ranging from very poor to good. The tire running temperatures recorded are the hottest temperatures developed in any portion of the tire during the test period.

Table 1

I. Natural vs. Natural PBD Unit Treads

| Tread Construction | Tire Running Temperature | Tread Wear Rating | Tread Cracking, inches | Rib Tear Rating |
|---|---|---|---|---|
| Natural | 265 | 100 | 0 | Good. |
| Natural/PBD | 264 | 117 | 0 | Very poor. |

II. Natural vs. SBR Unit Treads

| Natural | 256 | 100 | 0 | Good. |
| SBR | 298 | 95 | 0 | Poor. |

III. Natural vs. SBR/PBD Unit Treads

| Natural | 263 | 100 | ¼ | Good. |
| SBR/PBD | 312 | 138 | 0 | Good. |

IV. Natural vs. SBR/PBD Cap-Natural Base Treads

| Natural | 240 | 100 | 5 | Good. |
| SBR/PBD Cap: Natural Base | 220 | 117 | 11 | Very poor. |

V. Natural vs. SBR/PBD Cap-Natural/PBD Base Treads

| Natural | 255 | 100 | 0 | Good. |
| SBR/PBD Cap: Natural/PBD Base | 250 | 134 | 0 | Good. |

The unit natural treads and the unit SBR treads shown in the above table were compounded in accordance with standard formulations based on 50 parts of abrasive type carbon black per 100 parts of rubber hydrocarbon and a conventional sulfur cure all as well known by anyone familiar with the rubber compounding art. The SBR/PBD cap formulations and the natural/PBD base formulations were compounded as shown in Example 1.

By referring to the data presented in the foregoing table it will be seen that a tread having a cap-base type construction wherein the cap is formed from SBR and PBD rubbers overlying a base of natural rubber has a very satisfactory cool running temperature, but that such construction promotes groove cracking and rib tearing in the cap portion of the tread. However, a tread having a cap-base type construction in accordance with the present invention wherein an SBR/PBD cap overlies a base composed of a blend of natural rubber and PBD has very satisfactory running temperatures without sacrificing any of the desirable properties which are obtained from treads having the cap portion compounded from a blend of SBR and polybutadiene.

Having provided a complete description of the invention in such manner as to distinguish it from other inventions and from what is old, and having provided a description of the best mode contemplated of carrying out the invention, the scope of the patent protection to be granted the invention is defined by the following claims.

I claim:

1. A pneumatic vehicle tire having a tread characterized by (1) an outer road-contacting cap comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of an elastomeric copolymer of butadiene and styrene and (2) a base portion underlying said road-contacting cap comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of polyisoprene in which at least about 80% is of cis-1,4 structure.

2. A pneumatic vehicle tire having a tread characterized by (1) an outer road-contacting cap comprised of from 20 to 75% by weight of a rubbery stock of polybutadiene having at least about 30% of its polymerized monomer units in a cis-1,4 configuration, and no more than about 15% of its monomer units polymerized through 1,2 addition, and from 80 to 25% by weight of a rubbery stock of an elastomeric copolymer of butadiene and styrene and (2) a base portion interposed between said road-contacting cap portion of the tread and a breaker strip which is in direct contact with the tire carcass, said base portion being comprised of from 80 to 25% by weight of a rubbery stock of polyisoprene in which at least about 80% is of cis-1,4 structure, and from 20 to 75% by weight of a rubbery stock of polybutadiene having at least about 30% of its polymerized monomer units in a cis-1,4 configuration and no more than about 15% of its monomer units polymerized through 1,2 addition.

3. A pneumatic vehicle tire having a tread area characterized by (1) an outer road-contacting cap extending over the entire road-contacting portion of the tire, said cap being comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of an elastomeric copolymer of butadiene and styrene and (2) a base portion interposed between said road-contacting cap portion of the tread and the tire carcass, said base portion being comprised of from 80 to 25% by weight of a rubbery stock of polyisoprene in which at least about 80% is of cis-1,4 structure, and from 20 to 75% by weight of a rubbery stock of a polymer of polybutadiene having at least about 30% of its polymerized monomer units in a cis-1,4 configuration and no more than about 15% of its monomer units polymerized through 1,2 addition.

4. A pneumatic vehicle tire having a tread characterized by (1) an outer road-contacting cap comprised of from 20 to 75% by weight of a rubbery stock of polybutadiene having at least about 30% of its polymerized monomer units in a cis-1,4 configuration and no more than 15% of its monomer units polymerized through 1,2 addition, and from 80 to 25% by weight of a rubbery stock of an elastomeric copolymer of butadiene and styrene, said road-contacting cap having at least 1/16 of an inch of rubber below the tread grooves and (2) a base portion underlying said road-contacting cap comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of polyisoprene in which at least about 80% is of cis-1,4 structure, said base portion of the tread being at least 1/16 of an inch in thickness.

5. An improved rubber tread for use in building pneumatic tires characterized by (1) a road-contacting portion comprised of from 20 to 75% by weight of a rubbery stock of polybutadiene having at least about 30% of its polymerized monomer units in a cis-1,4 configuration and no more than about 15% of its monomer units polymerized through 1,2 addition, and from 80 to 25% by weight of a rubbery stock of an elastomeric copolymer of butadiene and styrene and (2) a base portion underlying said road-contacting portion comprised of from 20 to 75% by weight of a rubbery stock of polybutadiene having at least 30% of its polymerized monomer units in a cis-1,4 configuration and no more than about 15% of its monomer units polymerized through 1,2 addition, and from 80 to 25% by weight of a rubbery stock of polyisoprene in which at least about 80% is of cis-1,4 structure.

6. A pneumatic vehicle tire having a tread characterized by (1) an outer road-contacting cap composed of 50% by weight of a rubbery stock of polybutadiene having at least about 30% of its polymerized monomer units in a cis-1,4 configuration and no more than about 15% of its monomer units polymerized through 1,2 addition, and 50% by weight of a rubbery stock of an elastomeric copolymer of butadiene and styrene and (2) a base portion underlying said road-contacting cap composed of 50% by weight of a rubbery stock of polybutadiene having at least about 30% of its polymerized monomer units in a cis-1,4 configuration and no more than about 15% of its monomer units polymerized through 1,2 addition, and 50% by weight of a rubbery stock of natural rubber.

References Cited in the file of this patent
UNITED STATES PATENTS

| | | |
|---|---|---|
| 2,672,914 | Weigold | Mar. 23, 1954 |
| 2,776,693 | Ferrin | Jan. 8, 1957 |
| 3,004,018 | Naylor | Oct. 10, 1961 |
| 3,060,989 | Railsback et al. | Oct. 30, 1962 |